United States Patent
Amit et al.

(10) Patent No.: US 9,805,046 B2
(45) Date of Patent: Oct. 31, 2017

(54) DATA COMPRESSION USING COMPRESSION BLOCKS AND PARTITIONS

(71) Applicant: INTERNATIONAL BUSINESS MACHINES CORPORATION, Armonk, NY (US)

(72) Inventors: Jonathan Amit, Omer (IL); Nir Halowani, Holon (IL); Chaim Koifman, Rishon-Lezion (IL); Sergey Marenkov, Tel Aviv (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 175 days.

(21) Appl. No.: 13/829,287

(22) Filed: Mar. 14, 2013

(65) Prior Publication Data

US 2014/0279967 A1 Sep. 18, 2014

(51) Int. Cl.
G06F 17/30 (2006.01)

(52) U.S. Cl.
CPC .............. *G06F 17/30153* (2013.01)

(58) Field of Classification Search
CPC ............... H03M 7/30; G06F 17/30067; G06F 17/30595
USPC ........................................................ 707/693
See application file for complete search history.

(56) References Cited

U.S. PATENT DOCUMENTS

| | | | |
|---|---|---|---|
| 5,237,460 A | | 8/1993 | Miller et al. |
| 5,481,701 A | | 1/1996 | Chambers, IV |
| 5,490,260 A | * | 2/1996 | Miller .................. G06F 3/0601 711/100 |
| 5,537,588 A | * | 7/1996 | Engelmann .......... G06F 3/0601 707/700 |
| 5,574,907 A | * | 11/1996 | Jernigan et al. |
| 5,649,151 A | | 7/1997 | Chu et al. |
| 5,734,892 A | | 3/1998 | Chu |
| 5,736,969 A | | 4/1998 | Kuga et al. |
| 5,867,114 A | | 2/1999 | Barbir |
| 6,324,540 B1 | * | 11/2001 | Khanna .................. G06T 17/20 |
| 6,360,300 B1 | * | 3/2002 | Corcoran .............. G06F 3/0608 711/113 |
| 6,999,088 B1 | | 2/2006 | Van Dyke et al. |
| 7,756,817 B2 | | 7/2010 | Merchia et al. |
| 7,827,187 B2 | * | 11/2010 | Raman et al. ................ 707/750 |
| 7,941,409 B2 | | 5/2011 | Mimatsu |
| 7,979,403 B2 | | 7/2011 | Kedem et al. |
| 8,279,096 B2 | * | 10/2012 | Nov .............................. 341/107 |
| 8,347,004 B2 | | 1/2013 | Amit et al. |
| 2006/0136402 A1 | * | 6/2006 | Lee ...................... G06F 17/3002 |
| 2009/0184957 A1 | * | 7/2009 | Kim et al. .................... 345/420 |
| 2009/0307250 A1 | | 12/2009 | Koifman et al. |

FOREIGN PATENT DOCUMENTS

| CN | 1949222 A | 4/2007 |
|---|---|---|
| CN | 101039417 A | 9/2007 |

* cited by examiner

*Primary Examiner* — Scott A Waldron
*Assistant Examiner* — Dongming Wang
(74) *Attorney, Agent, or Firm* — Griffiths & Seaton PLLC

(57) ABSTRACT

Compression blocks are divided into partitions creating a two dimensional divide of the compression blocks by slicing the compression blocks forming a first dimension and sub-partitioning the compression blocks into the partitions forming a second dimension. Each one of the partitions are compressed in separate compression streams.

9 Claims, 6 Drawing Sheets

DATA COMPRESSION USING COMPRESSION BLOCKS AND PARTITIONS

BACKGROUND OF THE INVENTION

Field of the Invention

The present invention relates generally to computers, and more particularly, to data compression using compression blocks and partitions in a computing environment.

Description of the Related Art

In today's society, computer systems are commonplace. Computer systems may be found in the workplace, at home, or at school. Computer systems may include data storage systems, or disk storage systems, to process and store data. Data storage systems, or disk storage systems, are utilized to process and store data. A storage system may include one or more disk drives. These data processing systems typically require a large amount of data storage. Customer data, or data generated by users within the data processing system, occupies a great portion of this data storage. Many of these computer systems include virtual storage components. Data compression is widely used to reduce the amount of data required to process, transmit, or store a given quantity of information. Data compression is the coding of data to minimize its representation. Compression can be used, for example, to reduce the storage requirements for files, to increase the communication rate over a channel, or to reduce redundancy prior to encryption for greater security. However, data compression consumes a significant amount of computing (e.g. central processing unit "CPU") resources. Also, data can be lost due to problems such as system crashes, hardware failures, and abnormal computing system halts. Journaled file systems can be used to maintain data integrity when these types of problems occur.

SUMMARY OF THE DESCRIBED EMBODIMENTS

In one embodiment, a method is provided for data compression using compression blocks and partitions using a processor device in a computing environment. Compression blocks are divided into partitions creating a two dimensional divide of the compression blocks by slicing the compression blocks forming a first dimension and sub-partitioning the compression blocks into the partitions forming a second dimension. Each one of the partitions is compressed in separate compression streams.

In another embodiment, a computer system is provided for data compression using compression blocks and partitions using a processor device in a computing environment. The computer system includes a computer-readable medium and a processor in operable communication with the computer-readable medium. Compression blocks are divided into partitions creating a two dimensional divide of the compression blocks by slicing the compression blocks forming a first dimension and sub-partitioning the compression blocks into the partitions forming a second dimension. Each one of the partitions is compressed in separate compression streams.

In a further embodiment, a computer program product is provided for data compression using compression blocks and partitions by a processor device in a computing environment. The computer-readable storage medium has computer-readable program code portions stored thereon. The computer-readable program code portions include a first executable portion creates two dimensional divide of the compression blocks by slicing the compression blocks forming a first dimension and sub-partitioning the compression blocks into the partitions forming a second dimension. Each one of the partitions is compressed in separate compression streams.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF CERTAIN EMBODIMENTS

Figure 1:
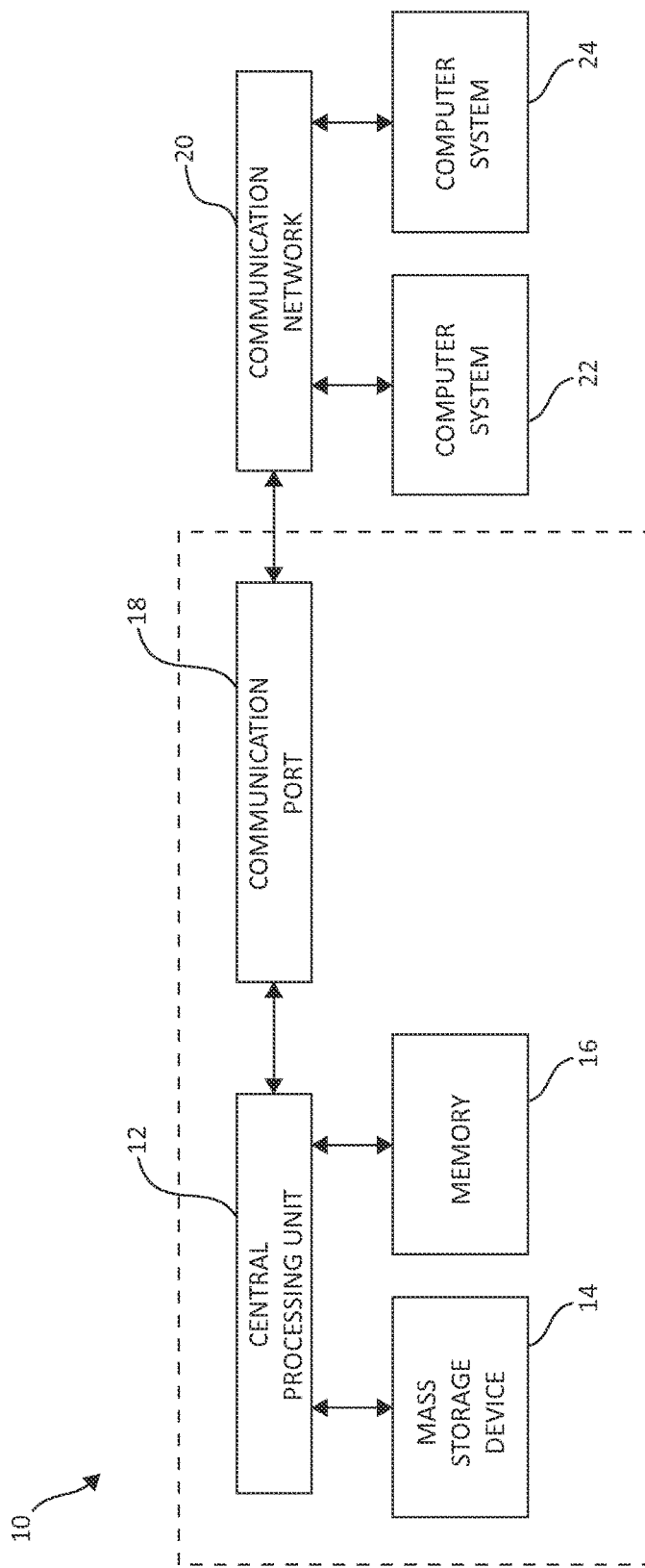
FIG. 1 is a block diagram illustrating a computer storage environment having an exemplary storage device in which aspects of the present invention may be realized.

In a data processing system or computing environment, a journaling (e.g., a block) storage system may be used to store the write operations in a journal (e.g., in a block). In a compressed journal system the journal holds compressed data. In one embodiment, journal system maintains file system integrity by recording information regarding updates to directories, bitmaps, and/or data, in a log, also called a journal, before the updates are written to a storage device such as a hard disk. In the event of a system crash or other problem, the information in the journal may be used to restore the file system to a consistent state. Full-journaling systems additionally perform data journaling, in which data updates are also stored in the journal, to ensure that no committed data is lost. In one embodiment, the ability to access the data randomly is accomplished by dividing the journal into blocks that use a separate dictionary.

Journal (e.g., block) storage may be characterized by the write pattern of the journal storage. In one embodiment, data chunks are stored in the order they were written at, so a logical offset of the data chunk has little or no relation to the physical location of the data chunk on the storage backend. Each data chunk is stored following the previous data chunk and invalidates any earlier data chunks written to same logical area.

In one embodiment, each data chunk is compressed prior to being written, and since the compression process by definition does not preserve the data size, the size of the compressed data chunk is unknown prior to the compression. Because of unknown size, multiple compressed data chunks (which may be different sizes) are written into a single fixed-size physical block. Each block may be considered as used while the fixed-size physical block contains at least one valid data chunk. To increase space utilization, a garbage collection process may be performed on low-utilization physical blocks.

As such, data compression creates challenges to perform random access operations due to the unpredicted compressed output. In one embodiment, a need exists to provide random access operations beyond merely performing efficient random access to compressed data by dividing data into fixed blocks. For example, a compressed object may be written to disk in a log-structured (journal) format. Data is compressed in the order it is written by the user/app (time-based-compression/temporal locality). Each block is compressed with new compression-stream. So, in order to retrieve data form a compressed block, a need exists to decompress only that particular compressed block. Currently, specific workloads on random access to the data involve high CPU utilizations. Workloads suffer from high CPU and poor latency because for each user's read request, the compressed block is read, decompressed, and then the requested data is copied.

In order to increase the efficiency and productivity for efficient random access to existing data in a data compression system, in one embodiment, the present invention divides compression blocks into partitions creating a two dimensional divide of the partitions based on a variable partition size and a fixed partition size for compressing each one of the partitions in separate compression streams. In one embodiment, the compression blocks (which are of a fixed size) are sliced into sub-blocks (e.g., partitions). Each partition is compressed with a new compression stream (e.g., each partition is independently compressed in a new, separate compression stream). Since each partition has a self-contained compression stream, each partition may be decompressed independently (or even in parallel). There are two ways for partitioning the compressed block: (1) from virtual view perspective (variable partition size), (2) from compressed view perspective (fixed partition size). For example, assume there is a 64 KB compressed block size and 16 KB of partition size. Also assume that a user and/or application writes in 8 KB of IOs with a compression ratio of 50%. The input partition means for each 16 KB of the user's writes (one or more writes) the partitions are ended (reset the compression stream). In other words, each partition will have 2 user writes and the compressed block will have 8 partitions. The output partition means that each compressed block will be sliced into 4 partitions, and each partition will have 4 user writes. There are pros & cons to the use each of the options. For example, using output partitions will cause a split of a user write at the end of a partition (since the compressed data won't fit exactly into a partition). However, it is assumed the present invention does not need to choose a side, and both options are valid. However, in one embodiment, the input partition may be preferred but to end the partition after 16 KB of user writes on a user write boundary (e.g., without splitting the user write at the end of a partition so the partitions won't be exactly 16 KB, but will be close to 16 KB).

Sub-partitioning of the compressed block doesn't have a significant effect on the compression-ratio. By partitioning the blocks less data is read (e.g., read from a storage disk), only the partition which contains the requested data is read, less data is decompressed and the present invention may decompress only the partition which holds the requested data (compared to decompress the entire compressed block), and the present invention provides for faster garbage collection in order to cleanup overwritten blocks by moving full partitions from one compressed block to another without decompressing and recompressing the data. Also, the present invention allows for large compressed block sizes. Using much larger compressed block size reduces the memory needed for handling the compressed object (e.g., meta-data). Large blocks will also use more efficiently the underlying storage system in terms of striping and read-cache.

The following reasons demonstrate the need for using the two-dimensional divide for blocks and partitions instead of using small blocks. In other words the meaning of two-dimensional partition is as follows: a first dimension is to compress blocks and the second dimension is sub-partitioning the compressed blocks into further Partitions. Input partition will end up as variable partition after compression, and output partitions are of fixed compressed size. In other words, the partitioning of the physical space to blocks and partitions will be predefined and static and/or the divide may be configurable per a user's preferences and/or application specific workload. Since reading small blocks or large blocks from storage (e.g., from a storage disk) consumes the same time, and using large blocks with partitions will reduce the amount of IOPS. For example, it may be assumed that for the underlying storage layer, reading 16 KB or 64 KB take the same time (e.g., for striping) so to handle small IOs we will get the same performance, but handling large IOs will consume more disk IO while working with small-blocks, since the big IO will compressed into multiple small-blocks and will spread 'randomly' on the physical space (due to 'random' block allocation). Also, using the two-dimensional divide for blocks and partitions instead of using small blocks limits input data into compressed block. In case of highly compressible data, there may be a large amount of data that can be compressed into a block. For example, in case of highly compressible data (e.g., zeros, data that contains the same character, and/or data with a lot of repetitions) the present invention may compress megabytes (MBs) of data into a compressed block/partition. In this case the input partition will limit the input data that will be compressed into each partition.

With Partitions the input data is limited by the partition size. The size may be a target range size of 16 KB and/or 32 KB for the partition size but may be any other predefined partition size. The partitions enable control of a maximum input data size while in small blocks the amount of input data may be very large (depends on compression ratio). The maximum input data size will be (approximately) the size of the partition (in case of input partition). In workloads with large input/outputs (IOs), using small blocks requires large amount of metadata compared to large block with partition. Also, large block sizes require less RAM memory for handling metadata. Sub-partitioning the compressed block does not require additional memory.

Turning to FIG. 1, an example computer system 10 is depicted in which aspects of the present invention may be realized. Computer system 10 includes central processing unit (CPU) 12, which is connected to mass storage device(s) 14 and memory device 16. Mass storage devices may include hard disk drive (HDD) devices, which may be configured in a redundant array of independent disks (RAID). The garbage collection operations further described may be executed on device(s) 14, located in system 10 or elsewhere. Memory device 16 may include such memory as electrically erasable programmable read only memory (EEPROM) or a host of related devices. Memory device 16 and mass storage device 14 are connected to CPU 12 via a signal-bearing medium. In addition, CPU 12 is connected through communication port 18 to a communication network 20, having an attached plurality of additional computer systems 22 and 24. The computer system 10 may include one or more processor devices (e.g., CPU 12) additional memory devices 16 for each individual component of the computer system 10 to execute and perform each operation described herein to accomplish the purposes of the present invention.

Figure 2:
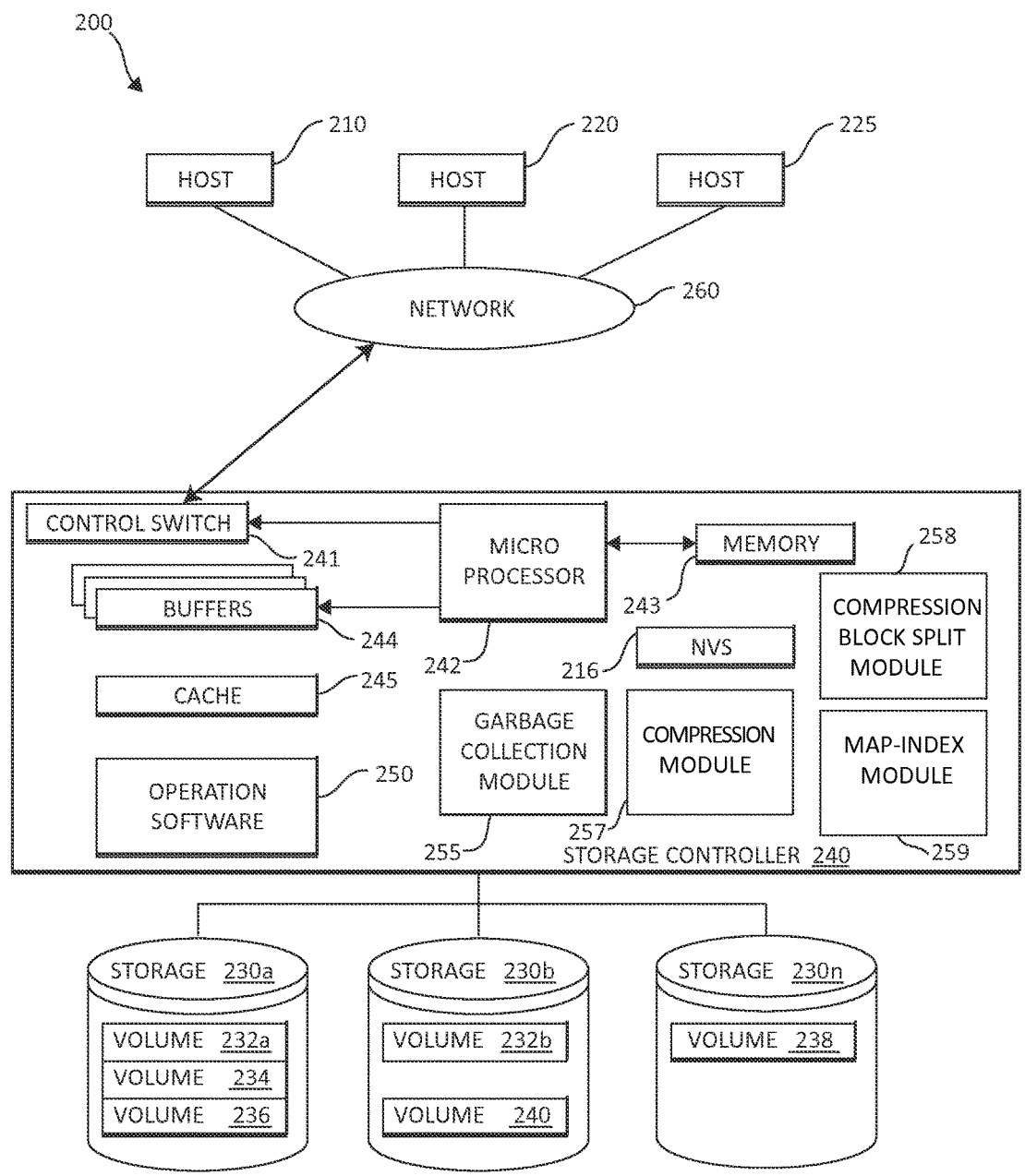
FIG. 2 is a block diagram illustrating a hardware structure of an exemplary data storage system in a computer system in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The hosts (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 2 comprising storage controller 240 and storage 230.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230 may be comprised of one or more storage devices, such as storage arrays, which are connected to storage controller 240 by a storage network.

In some embodiments, the devices included in storage 230 may be connected in a loop architecture. Storage controller 240 manages storage 230 and facilitates the processing of write and read requests intended for storage 230. The system memory 243 of storage controller 240 stores the operation software 250, program instructions and data, which the processor 242 may access for executing functions and method steps associated with managing storage 230, and executing the steps and methods of the present invention. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described herein.

In some embodiments, cache 245 is implemented with a volatile memory and nonvolatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a garbage collection module 255, a compression module 257, a compression block split module 258, and a map-index module 259 to assist with garbage collection in a compressed journal file system. The garbage collection module 255, the compression module 257, the compression block split module 258, and the map-index module 259 may work in conjunction with each and every component of the storage controller 240, the hosts 210, 220, 225, and storage devices 230. Both the garbage collection module 255, the compression module 257, the compression block split module 258, and the map-index module 259 may be structurally one complete module or may be associated and/or included with other individual modules. The garbage collection module 255, the compression module 257, the compression block split module 258, and the map-index module 259 may also be located in the cache 245 or other components of the storage controller 240 to accomplish the purposes of the present invention.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control and each table described later, cache 245 for temporarily storing (buffering) data, and buffers 244 for assisting the cache 245 to read and write data, a control switch 241 for controlling a protocol to control data transfer to or from the storage devices 230, and garbage collection module 255, the compression module 257, the compression block split module 258, and the map-index module 259 in which information may be set. Multiple buffers 244 may be implemented with the present invention to assist with garbage collection in a compressed journal file system as described herein.

In one embodiment, the host computers or one or more physical or virtual devices, 210, 220, 225 and the storage controller 240 are connected through a network adaptor (this could be a fibre channel) 260 as an interface i.e., via a switch called "fabric." In one embodiment, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, and garbage collection module 255, the compression module 257, the compression block split module 258, and the map-index module 259 are in communication with each other and may be separate or one individual component(s). Also, several, if not all of the components, such as the operation software 250 may be included with the memory 243 for performing garbage collection in a compressed journal file system. Each of the components within the devices shown may be linked together and may be in communication with each other for purposes suited to the present invention.

Figure 3:
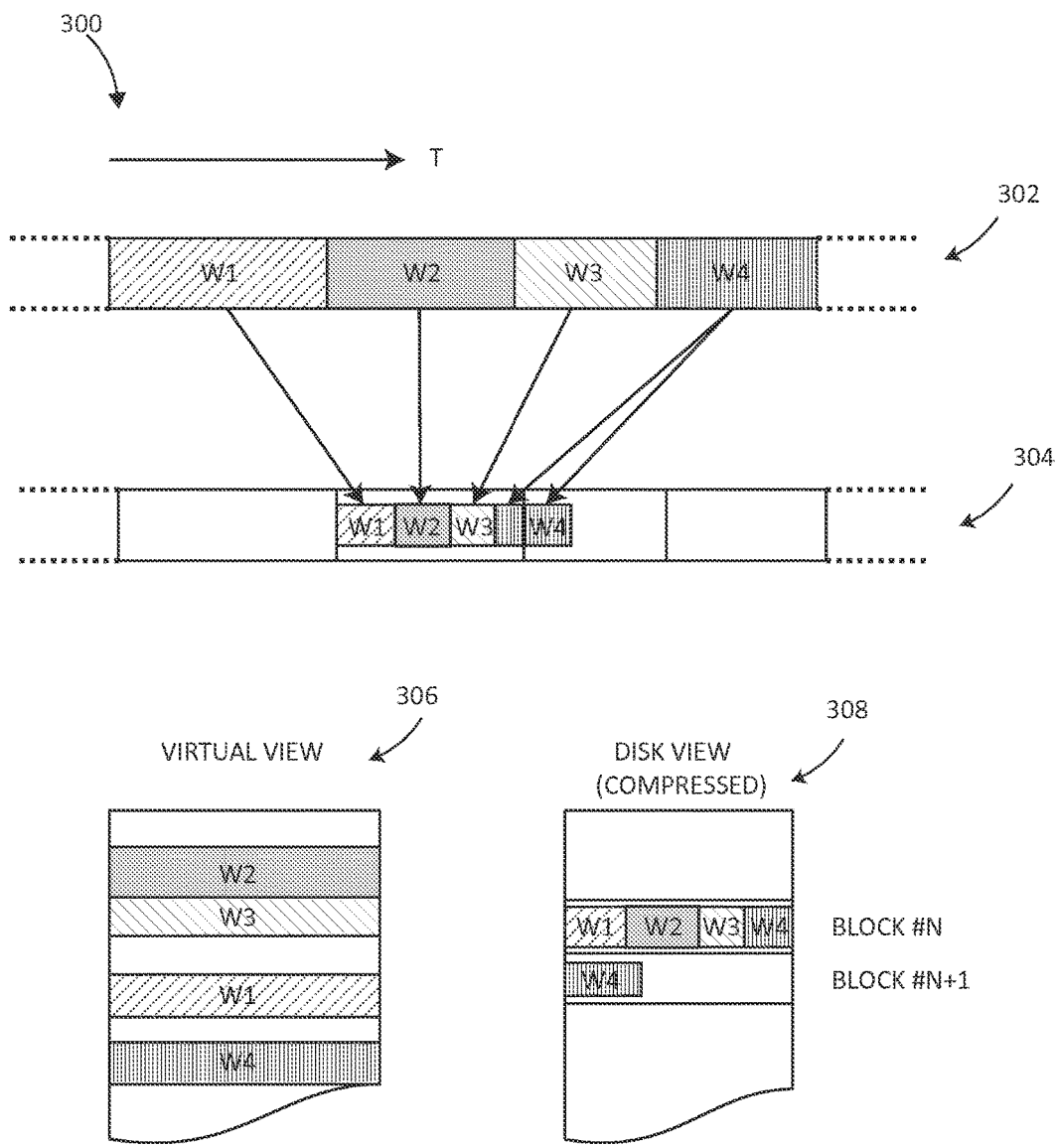
FIG. 3 is a block diagram illustrating a compression block partition into one dimensional split system in which aspects of the present invention may be realized.
Figure 4:
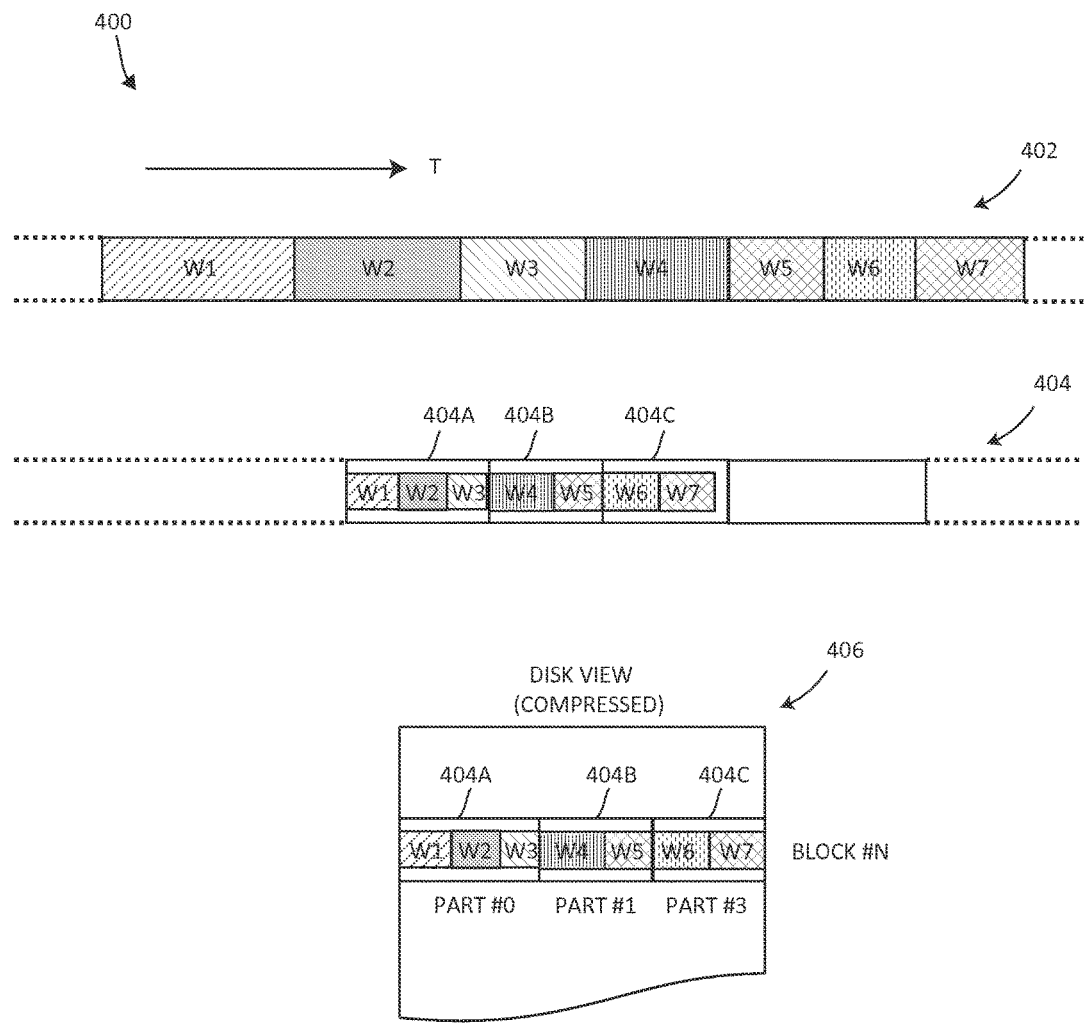
FIG. 4 is a block diagram illustrating a two-dimensional compression block partition split system in which aspects of the present invention may be realized.

FIG. 3 illustrates an exemplary block diagram 300 showing a compression block system with a compression block partition split into a one dimensional split system. In a data processing system, compression block may be used to store the write operations 302, as shown by W1, W2, W3, and W4. The data W1, W2, W3, and W4 is compressed, which may then be stored in block segments 304 shown as compression blocks having the compressed data W1, W2, W3, and W4. The compression blocks contain the compressed write operations W1, W2, W3, and W4. Also illustrated is the time (indicated by a T with an arrow showing how the user's data is compressed into compressed-blocks. A virtual view 306 is shown with the write operations W1, W2, W3, and W4, which show fixed size compressed blocks without sub-partitioning the compressed block into partitions). A disk view 308 (compressed) (of block segments 304) is shown with the compressed write operations W1, W2, W3, and W4 with W1, W2, W3, and part of W4 in block #N and part of W4 in block number #N+1. In one embodiment, by way of example only, if a user and/or applications desires to read the data that is written in W2, a Index-Map is used to located, identify and/or find which block holds the compressed data. The compression block is read (e.g., from a disk). The block's data is decompressed and the requested data is retrieved and returned to the user and/or application that requested the data. However, for completely random access, the illustrations of FIG. 3 are decompressing far more data than the user and/or applications is requesting. Therefore for random access there is a high central processing unit (CPU) utilization (decompression) and high latencies (decompression & inefficient read-cache). In an alternative embodiment, the present invention provides an even more efficient process for efficient random access to existing data on any type of workload. Even with small input/output (IO) that spread randomly across the storage, the additional embodiments described herein may insure optimized CPU utilization. In one embodiment, by way of example only, if a user and/or applications desires to read the data that is written in W2, the Index-Map is used to locate, identify and/or find which block holds the compressed data. The compression block is read (e.g., from a disk). As illustrated in FIG. 4, only compression block (e.g., block #n) that contains partition 404A (or part #0) is read (e.g., read from a storage disk). Only the data from partition 404A (or part #0) is decompressed and only the requested data (W2) from partition 404A (or part #0) is retrieved and returned to the user and/or application that requested the data. However, for completely random access, the illustrations of FIG. 3 are decompressing far more data than the user and/or applications is requesting.

Turning now to FIG. 4, the present invention provides an even more efficient process for efficient random access to existing data by including a two dimensional division of compressed data using blocks and partitions in a storage system. FIG. 4 illustrates an exemplary block diagram 400 showing a two-dimensional compression block partition split system. In one embodiment, the two-dimensional compression block partition split 400 may be included in a compressed journal file system. In a data processing system, the two-dimensional compression block partition split system 300 may be used to store the write operations 402, as shown by W1, W2, W3, and W4. Also illustrated is the time (indicated by a T with an arrow showing how the user's data is compressed into compressed-blocks and partitions. The data W1, W2, W3, and W4 is compressed, which may then be stored in block segments 404 shown as compression blocks having the compressed data W1, W2, W3, and W4. The compression blocks 404 containing the compressed write operations W1, W2, W3, and W4 are divided into partitions 404A-C creating a two dimensional divide of the compression blocks 404 based on a variable partition size and a fixed partition size for compressing each one of the partitions 404A-C in separate compression streams. The ability to access the data randomly is done by dividing the compression blocks 404 into the partitions 404A-C. As illustrated in a disk view (compressed) 406 from block #N, and as seen from the compression blocks 404, partition 404A (or part #0 of 406) contain compressed data W1, W2, and W3. Partition 404B (or part #1 of 406) contain compressed data W4 and W5. Partition 404C (or part #3 of 406) contain compressed data W6 and W7.

Figure 5:
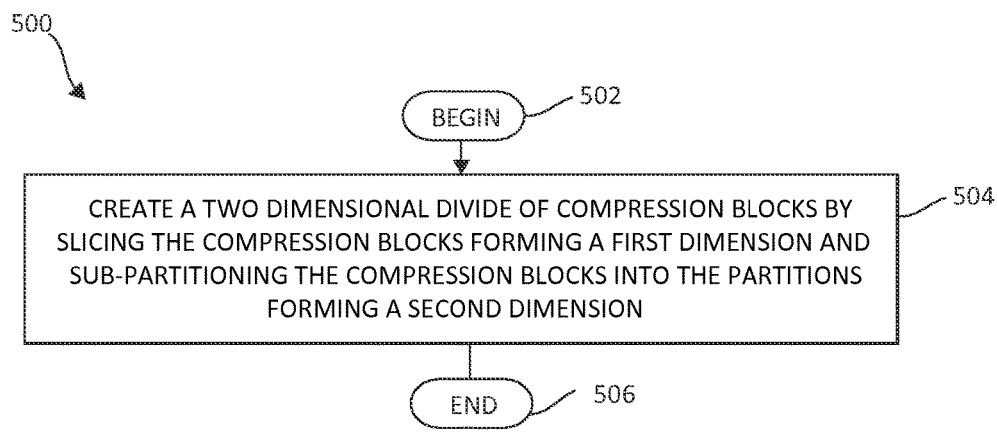
FIG. 5 is a flowchart illustrating an exemplary method for efficient random access to existing data in a data compression system in which aspects of the present invention may be realized.

FIG. 5 is a flowchart illustrating an exemplary method 500 for efficient random access to existing data in a data compression system. The method 500 begins (step 502) by creating a two dimensional divide of the compression blocks by slicing the compression blocks forming a first dimension and sub-partitioning the compression blocks into the partitions forming a second dimension (step 504). Each one of the partitions are compressed in separate compression streams. The method 500 ends (step 506).

Figure 6:
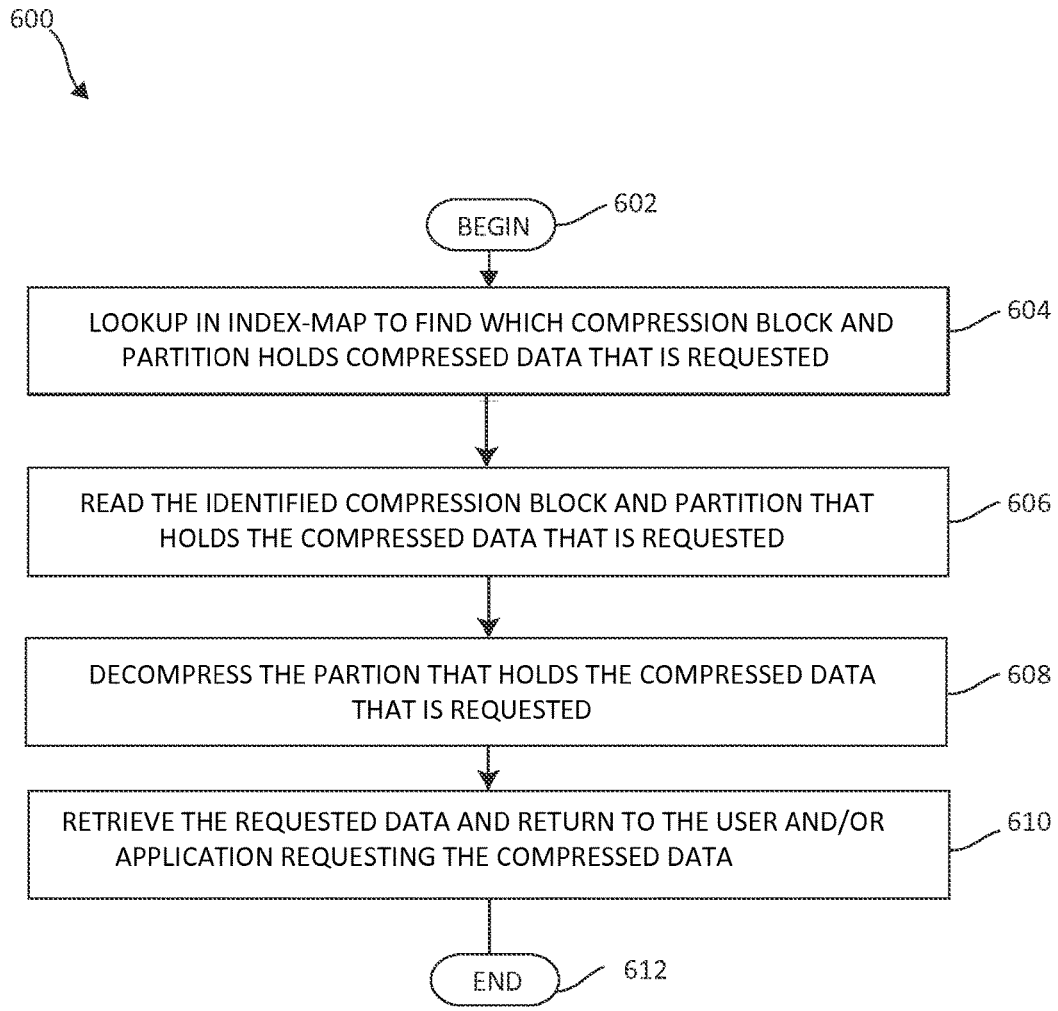
FIG. 6 is a flowchart illustrating an additional exemplary method for efficient random access to existing data in a data compression system in which aspects of the present invention may be realized.

FIG. 6 is a flowchart illustrating an alternative exemplary method 600 for efficient random access to existing data in a data compression system. The method 600 begins (step 502) by, having previously performed the steps of FIG. 5, looking up in an index-map to find locate, and/or identify which block holds the compressed data (step 504). The method 600 only reads the identified compression block and partition that holds the compressed data that is requested by a user and/or an application(s) (step 602). The method 600 decompresses only the partition that holds the compressed data that is requested by a user and/or an application(s) (step 608). The method 600 retrieves the requested data and returns to the user and/or application(s) requesting the compressed data (step 610). The method 600 ends (step 612).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for data compression using compression blocks and partitions by a processor device in a computing environment, the method comprising:
   for randomly accessed data, creating a two dimensional divide of the compression blocks by slicing the compression blocks forming a first dimension, the first dimension compressing the compression blocks which are output as variable-sized partitions, and forming a second dimension by sub-partitioning each of the variable-sized partitions of the compression blocks into fixed-sized sub-partitions, wherein each one of the sub-partitions are compressed in separate compression streams;
   independently compressing each one of the sub-partitions;
   independently decompressing each one of the sub-partitions;
   decompressing each one of the sub-partitions in parallel with at least an additional one of the sub-partitions; and
   when reading the randomly accessed data, reading only requested data within a respective one of the fixed-sized sub-partitions within a respective one of the compression blocks by the independent decompression of only the respective one of the compression blocks and the respective sub-partition holding the requested data.

2. The method of claim 1, further including locating in a map only the respective one of the compression blocks and the respective one of the sub-partitions holding compressed data for the requested data, wherein the compressed blocks are fixed in size.

3. The method of claim 1, further including performing each one of:
   reading only the block and the sub-partition holding compressed data for the requested data,
   decompressing only the block and the sub-partition holding compressed data, and retrieving the requested data.

4. A system for data compression using compression blocks and partitions in a computing environment, comprising:
   a processor device, operable in the computing storage environment, wherein the processor device:
   for randomly accessed data, creates a two dimensional divide of the compression blocks by slicing the compression blocks forming a first dimension, the first dimension compressing the compression blocks which are output as variable-sized partitions, and forming a second dimension by sub-partitioning each of the variable-sized partitions of the compression blocks into fixed-sized sub-partitions, wherein each one of the sub-partitions are compressed in separate compression streams;
   independently compresses each one of the sub-partitions;
   independently decompresses each one of the sub-partitions;
   decompresses each one of the sub-partitions in parallel with at least an additional one of the sub-partitions; and
   when reading the randomly accessed data, reads only requested data within a respective one of the fixed-sized sub-partitions within a respective one of the compression blocks by the independent decompression of only the respective one of the compression blocks and the respective sub-partition holding the requested data.

5. The system of claim 4, wherein the processor device locates in a map only the respective one of the compression blocks and the respective one of the sub-partitions holding compressed data for the requested data, wherein the compressed blocks are fixed in size.

6. The system of claim 4, wherein the processor device performs each one of:
   reading only the block and the sub-partition holding compressed data for the requested data,
   decompressing only the block and the sub-partition holding compressed data, and
   retrieving the requested data.

7. A computer program product for data compression using compression blocks and partitions in a computing environment by a processor device, the computer program product comprising a non-transitory computer-readable storage medium having computer-readable program code portions stored therein, the computer-readable program code portions comprising:
   a first executable portion that, for randomly accessed data, creates a two dimensional divide of the compression blocks by slicing the compression blocks forming a first dimension, the first dimension compressing the compression blocks which are output as variable-sized partitions, and forming a second dimension by sub-partitioning each of the variable-sized partitions of the compression blocks into fixed-sized sub-partitions, wherein each one of the sub-partitions are compressed in separate compression streams;
   independently compresses each one of the sub-partitions;
   independently decompresses each one of the sub-partitions;
   decompresses each one of the sub-partitions in parallel with at least an additional one of the sub-partitions; and
   when reading the randomly accessed data, reads only requested data within a respective one of the fixed-sized sub-partitions within a respective one of the compression blocks by the independent decompression of only the respective one of the compression blocks and the respective sub-partition holding the requested data.

8. The computer program product of claim 7, further including a second executable portion that locates in a map only the respective one of the compression blocks and the respective one of the sub-partitions holding compressed data for the requested data, wherein the compressed blocks are fixed in size.

9. The computer program product of claim 7, further including a second executable portion that performs each one of:
   reading only the block and the sub-partition holding compressed data for the requested data,
   decompressing only the block and the sub-partition holding compressed data, and retrieving the requested data.

* * * * *